(12) United States Patent
Wierzba et al.

(10) Patent No.: US 10,846,375 B2
(45) Date of Patent: Nov. 24, 2020

(54) SOFTWARE LICENSE DISTRIBUTION AND VALIDATION USING A DISTRIBUTED IMMUTABLE DATA STORE

(71) Applicant: MICROSOFT TECHNOLOGY LICENSING, LLC, Redmond, WA (US)

(72) Inventors: James Michael Wierzba, Bellevue, WA (US); Parmjeet Singh, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 297 days.

(21) Appl. No.: 15/950,533

(22) Filed: Apr. 11, 2018

(65) Prior Publication Data

US 2019/0318063 A1    Oct. 17, 2019

(51) Int. Cl.
    *G06F 21/10*    (2013.01)
    *H04L 9/30*     (2006.01)
    *H04L 9/32*     (2006.01)

(52) U.S. Cl.
    CPC .......... *G06F 21/105* (2013.01); *H04L 9/30* (2013.01); *H04L 9/3242* (2013.01);
    (Continued)

(58) Field of Classification Search
    CPC ...... G06F 21/10; G06F 21/105; G06F 21/645; G06F 2221/0753; G06F 2221/0788;
    (Continued)

(56) References Cited

U.S. PATENT DOCUMENTS

| 2017/0046806 A1* | 2/2017 | Haldenby | ............... G06Q 40/08 |
| 2017/0083860 A1* | 3/2017 | Sriram | ............... G06Q 10/0833 |

(Continued)

FOREIGN PATENT DOCUMENTS

| EP | 3226165 A1 | 10/2017 |
| WO | 2016164496 A1 | 10/2016 |
| WO | 2017195160 A1 | 11/2017 |

OTHER PUBLICATIONS

"International Search Report and Written Opinion Issued in PCT Application No. PCT/US19/025685", dated Jul. 5, 2019, 11 Pages.

*Primary Examiner* — Joseph P Hirl
*Assistant Examiner* — Sayed Aresh Beheshti Shirazi
(74) *Attorney, Agent, or Firm* — Rainier Patents, P.S.

(57) ABSTRACT

A license for software distributed to multiple users can be validated using a peer-to-peer network, asymmetrical cryptography and an essentially hack-proof public data store of licensing information, avoiding the need for a licensing server or central coordination by servers or host computers. Instances of the licensed software are implemented on the nodes of the peer-to-peer network. A distributed, immutable data store where each segment of data of the series of segments in the data store include a hash of the previous segment. Licensing transactions can be recorded and validated using the distributed, immutable data store. Licensing transactions can include but are not limited to provisioning, de-provisioning, activation and deactivation transactions. The license processing logic can be integrated into the licensed application software, so that once the licensed software is implemented on a user's computer, license generation, license revocation, license validation and license invalidation proceed automatically without the need for any intervention.

20 Claims, 7 Drawing Sheets

(52) U.S. Cl.
CPC .... *H04L 9/3247* (2013.01); *G06F 2221/0753* (2013.01); *G06Q 2220/18* (2013.01)

(58) Field of Classification Search
CPC ... G06Q 2220/18; H04L 2209/38; H04L 9/30; H04L 9/3236; H04L 9/3242; H04L 9/3247; H04L 2209/24; H04L 2209/56; H04L 63/0435; H04L 63/0442; H04L 63/061; H04L 63/062; H04L 63/08; H04L 63/0876; H04L 63/12; H04L 9/0816; H04L 9/0861; H04L 9/0891; H04L 9/0894; H04N 2005/91342; H04N 5/913
See application file for complete search history.

(56) References Cited

U.S. PATENT DOCUMENTS

| | | | |
|---|---|---|---|
| 2019/0036957 A1* | 1/2019 | Smith | H04L 63/1433 |
| 2019/0095909 A1* | 3/2019 | Wright | G06Q 20/3678 |
| 2019/0278916 A1* | 9/2019 | Lum | H04L 9/0894 |

* cited by examiner

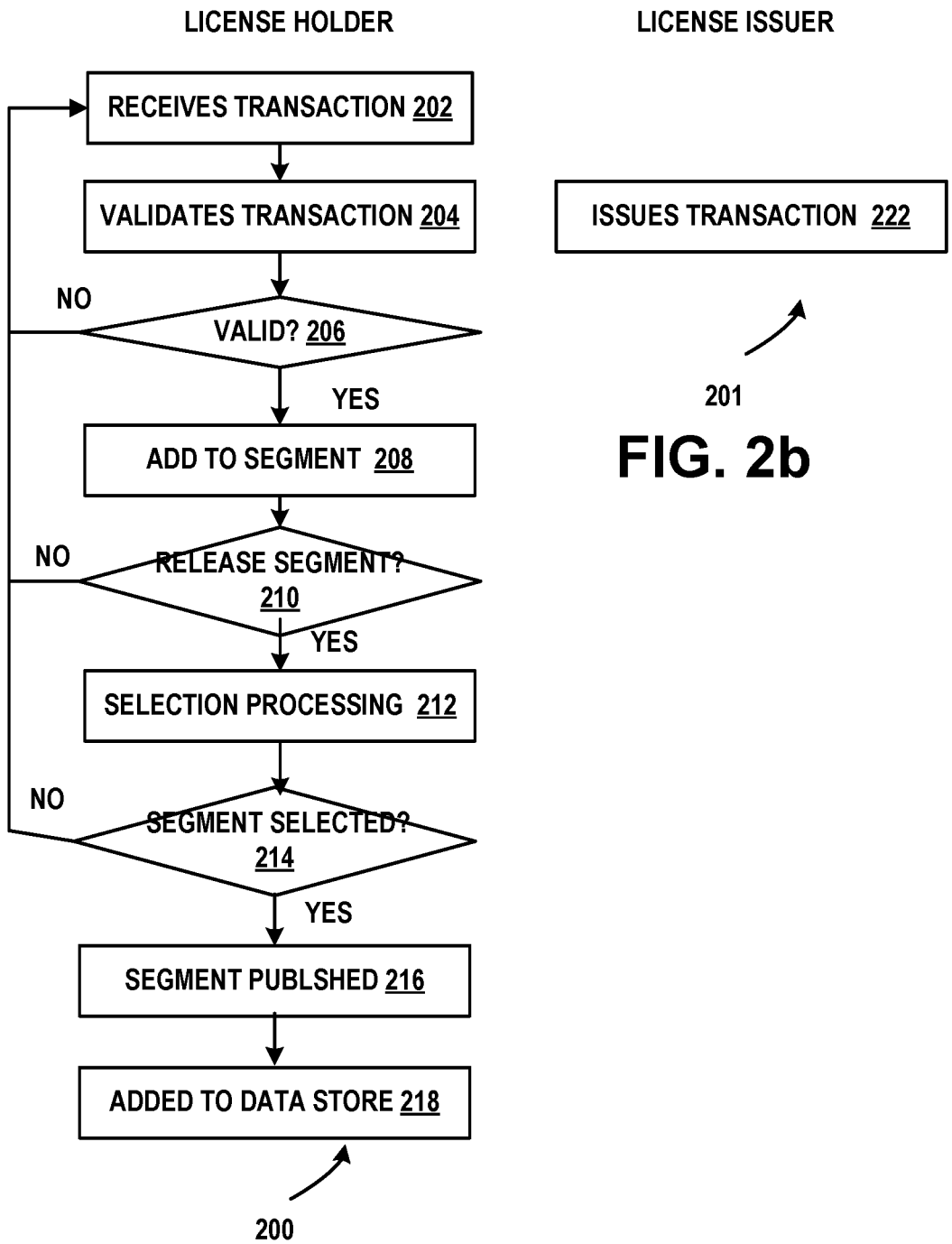

SOFTWARE LICENSE DISTRIBUTION AND VALIDATION USING A DISTRIBUTED IMMUTABLE DATA STORE

BACKGROUND

A software license gives the licensee permission to distribute and/or use software. Traditionally, a centralized licensing server receives a request from a client application and validates the request. In response to successful validation of the request, access to the software is granted. In response to receiving an invalid request, access to the software is denied.

SUMMARY

A peer-to-peer (P2P) network as disclosed herein can validate a software license for licensed software using asymmetrical cryptography and an immutable public data store of licensing information, avoiding the need for a licensing server. The peer-to-peer network is a network of nodes in which tasks or workloads are shared among the peers. A peer in the peer-to-peer network devotes a portion of its resources, including but not limited to processing power, disk storage, and network bandwidth to perform licensing processing. There is no central coordination by servers or host computers.

A peer can supply resources and can consume resources, in contrast to the traditional licensing client-server model in which the server validates the license and the client is granted access to the software by the valid license served by the server. The software licensing peer-to-peer network disclosed herein operates by using instances of the licensed software implemented on the nodes of the peer-to-peer network, enabling the peer-to-peer network to run without a central coordinator (i.e., without a license server) enabling the software publisher to avoid use of a software license server altogether. In place of the license server, a distributed data store of linked segments that stores valid transaction data and the peer-to-peer network is used.

One way to ensure the integrity of the data store is to have each segment of data of the series of segments in the data store of linked segments include a hash of the previous segment. Because each segment includes a hash of the previous segment, changing any content in a segment of the data store changes the hash of the segment, making it no longer match the hash in the next segment. Thus, to make a modification to any segment every subsequent segment in the data store would also have to be changed to maintain integrity of the data store. Because segment processing including derivation of the hash is computationally difficult and time-consuming, unauthorized changing of the data store is not feasible (so difficult as to be essentially impossible). Licensing transactions can be validated and can be recorded into the distributed data store of linked segments.

Licensing transactions can include but are not limited to provisioning, de-provisioning, activation and deactivation transactions. License holders can generate and issue activation and deactivation transactions for publication. License issuers can generate and issue provisioning and de-provisioning transactions. License processing logic can be integrated into or can accompany the licensed application software or the license processing logic can be provided separately, so that once the licensed software is implemented on a user's computer, license generation, license revocation, software activation and software deactivation proceed automatically without the need for any intervention by a central authority.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings:

FIG. 2a illustrates an example of method 200 that uses a distributed immutable data store to perform licensing activities in accordance with aspects of the subject matter described herein;

FIG. 2b illustrates an example of method 201 that uses a distributed immutable data store to perform licensing activities in accordance with aspects of the subject matter described herein.

DETAILED DESCRIPTION

Overview

Figure 1A:
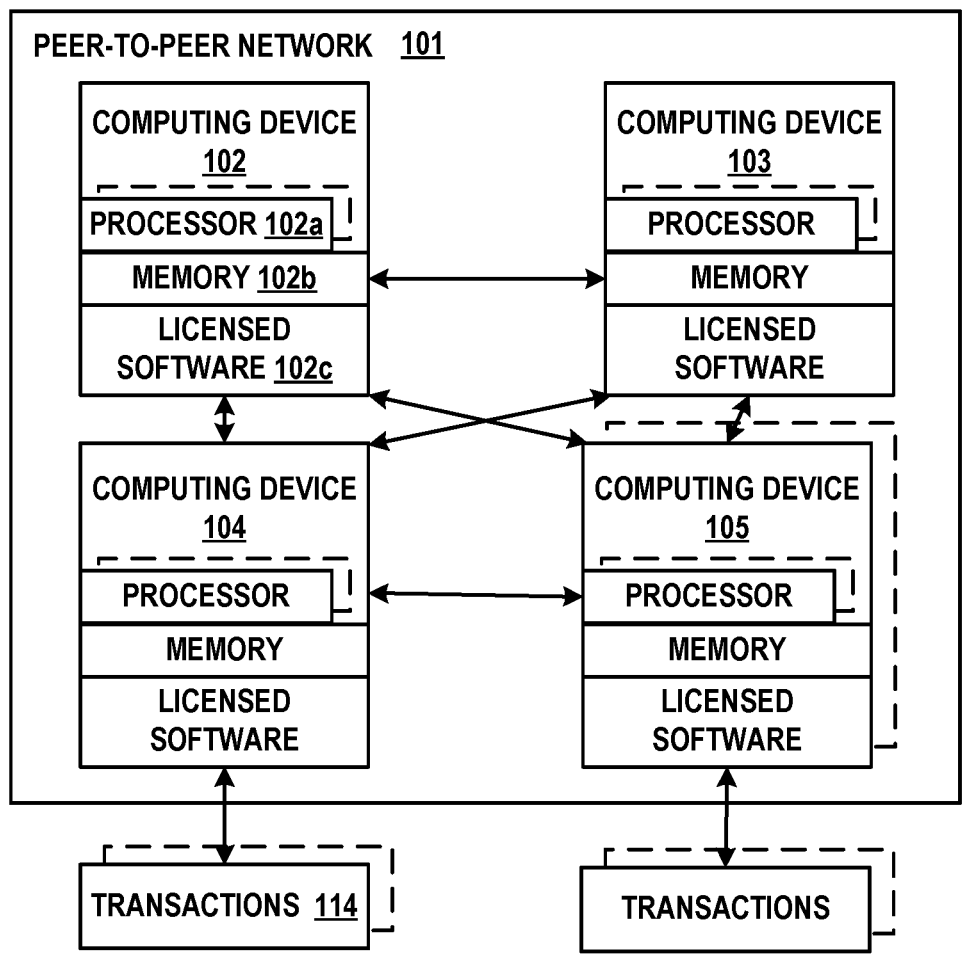
FIG. 1a is a block diagram 100a representing an example of a peer-to-peer system in which software license distribution and validation uses a distributed immutable data store in accordance with aspects of the subject matter disclosed herein.

The licensing of software that is distributed to users to run on their computers or other computing devices is traditionally implemented using a license server that processes license validation requests made by clients. A license server authorizes licenses for software applications that are distributed to multiple users. The license server can respond to requests by users to access locally installed licensed software programs. ("Locally installed" means the software is installed on the user's computer, in contrast to the user accessing the software via the Internet or in "the cloud". "Licensed software" refers to software that is subject to a software license for legal use.) Because the license server has to validate the software license before the user can use the software, if the license server goes down, a licensed user will not have access to the licensed software. Hence, a license server has to be maintained and monitored closely.

In accordance with aspects of the subject matter disclosed herein, the publisher of licensed software or his agent, etc.

can distribute licensed software to a prospective license holder who by virtue of receiving a valid license for the licensed software becomes a peer in the software licensing peer-to-peer network. The software can be accompanied by or have incorporated within it one or more of: a licensing agreement, license processing logic or software, a whitelist of approved license issuers, and/or a copy of a current data store of linked segments, each segment including: a hash of the previous segment, licensing transaction data and a hash of the segment.

The software publisher can designate one or more approved license issuers by creating a whitelist in which an approved license issuer is identified by the presence of the license issuer's public key in the whitelist. The whitelist of approved license issuer public keys can be maintained by the software publisher. For example, if a license issuer is compromised, (e.g., the private key of the license issuer is no longer secret), the license issuer's public key can be removed from the whitelist, rendering the provisioning and de-provisioning transactions made by the license issuer invalid. When a whitelist is updated, the updated whitelist can be distributed to license holders via updates to the licensed software.

A license issuer can issue a license to use licensed software to a prospective license holder using a provisioning transaction. A license issuer can revoke a license to use licensed software using a de-provisioning transaction. The provisioning and de-provisioning transactions created by a license issuer can be published to the peer-to-peer network. In accordance with some aspects of the subject matter disclosed herein, the transactions can be added to a queue that is accessible to all the nodes in the peer-to-peer network. If a license issuer is compromised, (e.g., the private key of the license issuer is no longer secret), the whitelist can be used to invalidate transactions made by the license issuer by removing the public key identifying the license issuer from the whitelist, rendering the provisioning and de-provisioning transactions made by the license issuer invalid. In accordance with some aspects of the subject matter disclosed herein, the addition and removal of public keys of license issuers from the whitelist is controlled by the software publisher. A license issuer can be a node in the peer-to-peer network. Alternatively, the license issuer can issue transactions to the peer-to-peer network while not being a node in the peer-to-peer network.

A license holder is a licensed user of the licensed software who can run the licensed software locally. The license holder can submit activation and deactivation transactions that can activate or deactivate the user's licensed software. An activation or deactivation transaction generated by a license holder can be published to the peer-to-peer network. In accordance with some aspects of the subject matter disclosed herein, the transactions can be added to a queue that is accessible to all the nodes in the peer-to-peer network. Transactions that are published in the peer-to peer network can be received by any node in the network.

Each license holder can build a segment and when the segment is complete, can offer the segment as a prospective addition to the distributed data store. A segment built by a node can include a hash of the previous segment, (i.e., the last segment in the distributed data store) the transaction data and a hash of the current segment. A segment created by one node may not necessarily include an identical set of transactions as does a segment created by another node. The peer-to-peer network may keep track of which transactions have been added to the data store and which transactions are yet to be added to the data store. The size of the segment built by a node can be pre-defined. For example, the size of the segment may be set to the size needed for: the hash of the previous segment, the data portion of the segment and the hash of the current segment. The data portion of the segment may be set to the size needed for a particular number of transactions (e.g., 5 transactions).

Selection of the segment that is added to the distributed data store can be determined by logic or a set of rules in the license processing logic integrated into or accompanying the licensed software. In accordance with some aspects of the subject matter disclosed herein, which segment is selected can be based on a consensus proof of work algorithm in which each node validates each licensing transaction. The segment that is chosen to be appended to the publicly distributed immutable data store can be published to the network. Each node in the peer-to peer network can add the published segment to its copy of the distributed data store. Each node in the peer-to peer network can discard the segment the node was building before it received the published segment and can begin building a new segment. The peer-to peer network can keep track of which transactions were added to the published segment to ensure that all valid transactions eventually are added to the distributed data store.

Transactions types can include a provisioning transaction that creates a license for the licensed software. In accordance with some aspects of the subject matter described herein, a provisioning transaction includes a sender identifier (e.g., a public key used to identify the sender, a license issuer), a digital signature that can be used to authenticate the sender public key and a public key that identifies the license being provisioned. The associated private key for the license can be handed to a prospective license holder separately in a secure manner. A de-provisioning transaction can be used to revoke a license. A de-provisioning transaction can include a public key identifying the sender, (e.g., a license issuer), a digital signature that can be used to authenticate the sender public key and a public key identifying the license that is being revoked.

An activation transaction can be used to "turn on" the software. An activation transaction can activate the software license. In accordance with some aspects of the subject matter disclosed herein, an activation transaction includes a license public key identifying the license holder's license (e.g., the user's software license being activated) and a digital signature that authenticates the license public key. A deactivation transaction can "turn off" the software. An deactivation transaction can deactivate the software license. In accordance with some aspects of the subject matter disclosed herein, a deactivation transaction can include a license public key identifying the license holder's license (e.g., the user's software license being deactivated) and a digital signature that can be used to authenticate the license public key. Transactions can include a sequence number in accordance with some aspects of the subject matter disclosed herein.

In accordance with aspects of the subject matter disclosed herein, a provisioning transaction is valid if the sender public key value is in the license issuer whitelist and the license public key is not already provisioned, that is, no previous provisioning transaction with the same license public key that is not followed by a de-provisioning transaction of that same license public key exists. A de-provisioning transaction is valid if the sender public key value is in the license issuer whitelist and the license public key is already provisioned, i.e., there exists a previous provisioning transaction with the same license public key that is not followed by a de-provisioning of that same license public key. An activation transaction is valid if the license public key is a currently provisioned license, i.e., the most recent provisioning/de-provisioning transaction for the license is a provisioning transaction, the license public key is not currently activated, i.e., there exists no activation transactions, or the most recent activation/deactivation transaction for the license is a deactivation transaction. A deactivation transaction is valid if the license public key is a currently provisioned license, i.e., the most recent provisioning/de-provisioning transaction for the license is a provisioning transaction and the license public key is currently activated, i.e., the most recent activation/deactivation transaction for the license is an activation transaction.

Asymmetrical cryptography uses pairs of keys, where each pair of keys includes a public key which is typically widely disseminated and a private key intended to be known only by the owner (private key holder). Asymmetrical cryptography can authenticate the user because the public key can be used to verify that the owner of the paired private key sent the message. The strength of an asymmetrical cryptography system derives from the computational effort needed to guess the private key if it is unknown. If the computational effort required to guess the private key is not feasible to be performed, only the private key has to be kept secret from everyone except the private key holder. A digital signature that employs asymmetric cryptography can be used to authenticate a message sent through a non-secure channel by giving the receiver reason to believe the message was sent by the claimed sender. A key generation algorithm for a digital signature can select a private key from a set of possible private keys and can output the private key and a corresponding public key. Given a message and a private key, a signing algorithm can produce a signature. Given the message, public key and signature, a signature verifying algorithm can accept or reject the message's claim to authenticity. Thus authenticity of a signature generated from the message and the private key can be verified by using the corresponding public key. It will be appreciated that although described in the context of software licensing, the subject matter disclosed herein is applicable to any licensed matter.

Software License Distribution and Validation Using a Distributed Immutable Data Store FIG. 1a is a block diagram representing an example of a system 100a that uses a distributed immutable data store to perform license processing in a peer-to-peer network in accordance with aspects of the subject matter described herein. All or portions of system 100a may reside on one or more computers or computing devices such as the computers described below with respect to FIG. 3. System 100a or portions thereof may be provided as a stand-alone system or as a plug-in or add-in.

System 100a or portions thereof may include information obtained from a service (e.g., in the cloud) or may operate in a cloud computing environment. Cloud computing enables access to shared pools of configurable system resources. It can also provide various services that can be set up rapidly with little effort. Sharing of resources provides economies of scale. Cloud computing enables an entity to focus on its actual business instead of having to provide its own computer infrastructure and maintenance. A cloud computing environment can be an environment in which computing services are not owned but are provided on demand. For example, information may reside on multiple devices in a networked cloud and/or data can be stored on multiple devices within the cloud. Cloud providers typically use a "pay-as-you-go" paradigm. In accordance with aspects of the subject matter disclosed herein, operating in a cloud computing environment provides the advantage of large quantities of data for analysis.

System 100a can include one or more computing devices. Contemplated computing devices include but are not limited to desktop computers, tablet computers, laptop computers, notebook computers, personal digital assistants, smart phones, cellular telephones, sensors, mobile telephones, servers, virtual machines, devices including databases, firewalls and so on. A computing device can include one or more processors and a memory that communicates with the one or more processors.

System 100a can include a peer-to-peer network such as peer-to-peer network 101. Peer-to-peer network 101 can include multiple nodes such as but not limited to computing device 102, computing device 103, computing device 104, computing device 105 and so on. It will be appreciated that although only four nodes are illustrated in peer-to-peer network 101, system 100a can include a peer-to-peer network comprising any number of nodes. Each node can be a computing device including one or more processors, and a memory connected to the processor(s) node. For example, computing device 102 includes one or more processors such as processor 102a, etc., and a memory such as memory 102b. Each node can also include a copy of licensed software. For example, computing device 102 includes a copy of licensed software 102c. Each node in peer-to-peer network 101 can generate and receive licensing transactions. For example in FIG. 1a, computing device 104 generates and/or receives licensing transactions such as transactions 114, etc. A node in peer-to-peer network 101 can be a license issuer. A node in peer-to-peer network 101 can be a license holder.

Figure 1B:
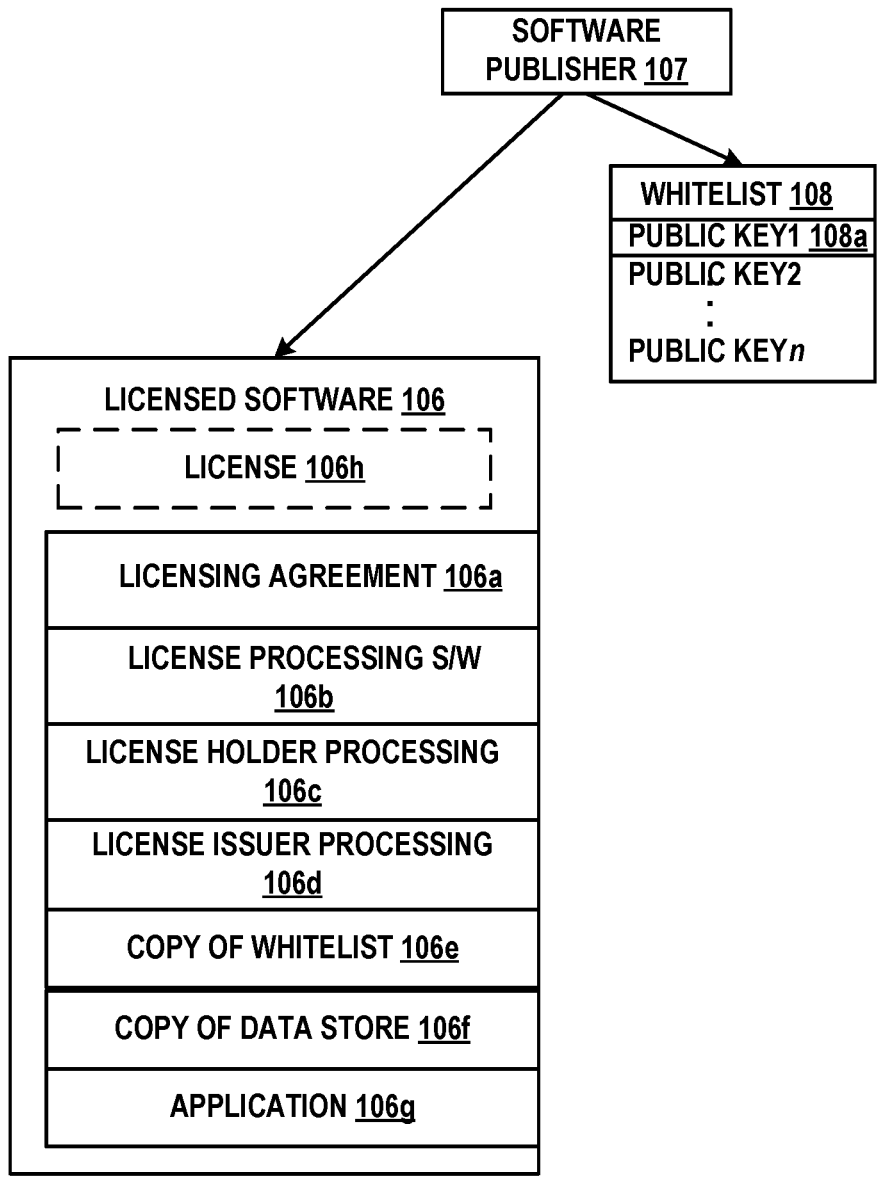
FIG. 1b is a block diagram 100b representing a more detailed example of a portion of block diagram 100a in accordance with aspects of the subject matter disclosed herein.

FIG. 1b is a block diagram 100b representing an more detailed example of a portion of block diagram 100a in accordance with aspects of the subject matter disclosed herein. System 100b may include one or more program modules which when loaded into the memory and accessed by the one or more processors configure the processor or processors to perform the actions attributed to the one or more program modules. In accordance with aspects of the subject matter disclosed herein, a publisher such as software publisher 107 can distribute licensed software such as licensed software 106.

Licensed software 106 can include software such as application 106g (the software the user wants to use on his computer). Licensed software 106 can by default include a license (a particular public/private key pair such as license 106h) in a deactivated state. Alternatively, license 106h may be incorporated into the application 106g. When the licensed software 106 is provided to a user for use on the user's computing device, the license can be pre-provisioned in an inactive state and can be activated by the user as described more fully below. Licensed software 106 can include processing logic capable of receiving and inserting a public/private key pair from a license issuer in response to a node receiving a provisioning transaction as described more fully below. Licensed software 106 can include processing logic capable of revoking a license 106h (e.g., by removing a public/private key pair from licensed software 106 in response to receiving a de-provisioning transaction as described more fully below). In the absence of the presence of a provisioned and activated license 106h (public/private key pair), the licensed software will not work.

The licensed software 106 can also include a license agreement such as licensing agreement 106*a* and licensing processing software such as license processing software 106*b*. License processing software 106*b* can include license holder processing software such as license holder processing 106*c* and/or license issuer processing software such as license issuer processing 106*d*. Licensed software 106 can also include a copy of the whitelist as described above such as copy of whitelist 106*e*. Licensed software 106 can include a copy of a public distributed data store of licensing data as described above such as data store 106*f*.

The software publisher 107 can designate one or more approved license issuers in a whitelist such as whitelist 108. A license issuer is a party who can issue and revoke licenses for licensed software 106. Each of the approved license issuers can be associated with a public key such as public key 108*a* that uniquely identifies the license issuer. Whitelist 108 can be maintained (e.g., by the software publisher 107). Updates to the whitelist 108 can be provided to the license holders during normal software update procedures. Whitelist 108 can include a list of public keys which can identify the parties (i.e., license issuers) allowed to issue and revoke licenses using provisioning and de-provisioning transactions and public key cryptography. Public key cryptography, or asymmetrical cryptography, is any cryptographic system that uses pairs of keys: public keys, which are typically disseminated widely, and private keys which are known only to the owner. Asymmetric cryptography can provide authentication, where the public key verifies that a holder of the paired private key sent the message.

If the computational effort needed to find the private key from its paired public key is great, effective security only requires keeping the private key private; the public key can be openly distributed without compromising security. If the private key of a license issuer is compromised, the whitelist 108 can be used to invalidate licensing transactions made by a license issuer by removing the public key (e.g., public key 108*a* identifying a license issuer in the whitelist 108) rendering the provisioning and de-provisioning transactions made by the license issuer identified by the public key invalid.

Figure 1C:
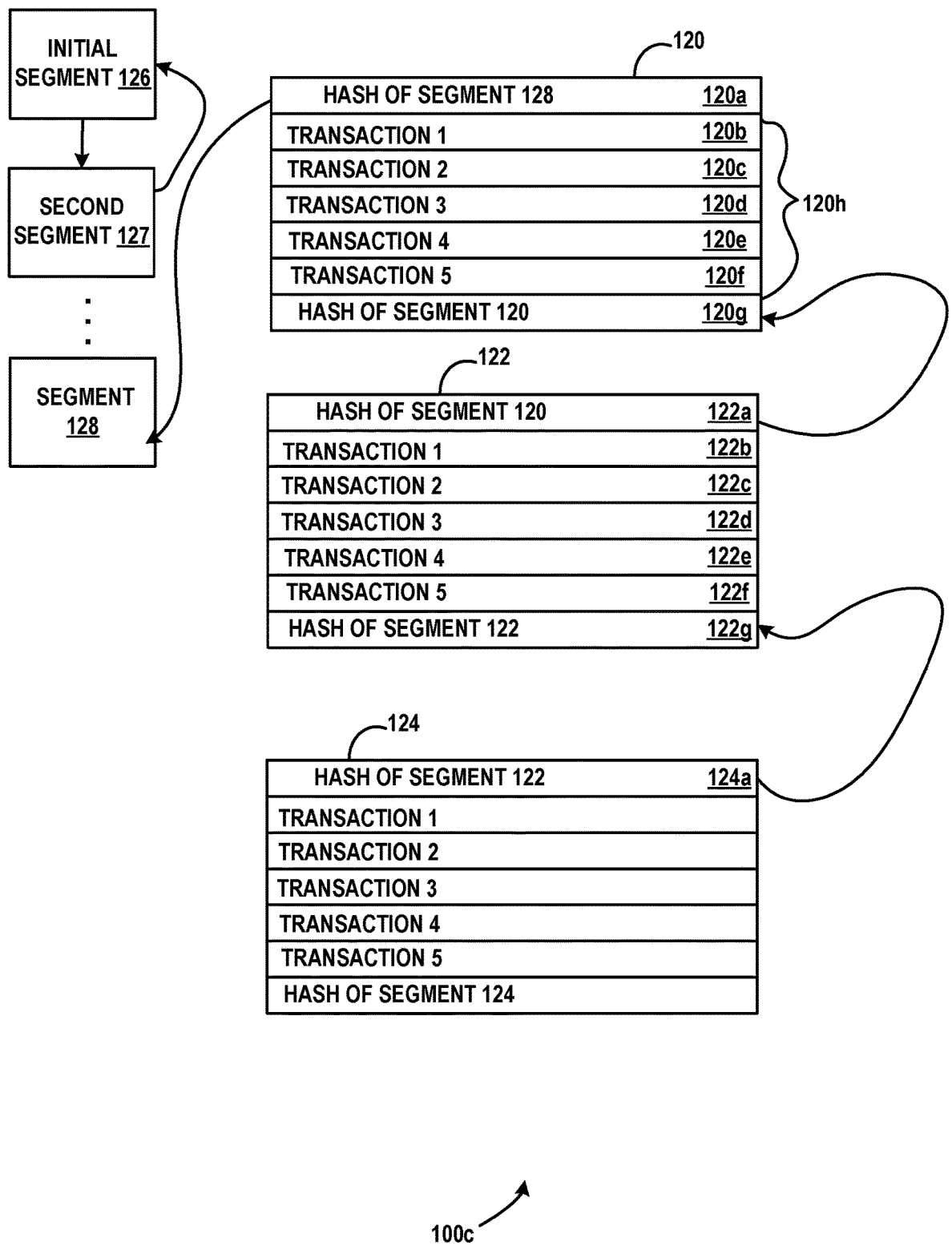
FIG. 1c is a block diagram 100c representing an example of a data store of segments in accordance with aspects of the subject matter disclosed herein.

FIG. 1*c* is a block diagram representing an example of a data store 100*c* comprising a series of linked segments in accordance with aspects of the subject matter disclosed herein. In FIG. 1*c*, data store 100*c* comprises initial segment 126, a second segment 127, a number of intervening segments indicated by the ellipses ( . . . ), segment 128, segment 120, segment 122 and segment 124. Each segment with the exception of the initial segment 126 comprises a hash of the previous segment, data and a hash of the current segment. For example, segment 120 includes a hash of segment 128 120*a*, licensing transaction data 120*h* (transaction 1 120*b*, transaction 2 120*c*, transaction 3 120*d*, transaction 4 120*e*, transaction 5 120*f*) and a hash of the segment 120 120*g*. Segment 122 includes a hash of previous segment, (hash of segment 120 122*a*), licensing transaction data (transaction 1 122*b*, transaction 2 122*c*, transaction 3 122*d*, transaction 4 122*e*, transaction 5 122*f*) and a hash of the current segment (i.e., hash of segment 122 122*g*). The segments are linked together. That is, segment 124 points back to segment 122, segment 122 points back to segment 120, segment 120 points back to segment 128 and so on. In FIG. 1*c*, the last (final) segment in the data store 100*c* is segment 124. When a new segment is added to the data store, the last segment, will be the segment to which the new segment points.

Moreover, to be valid, the hash of the current segment in a preceding segment has to be identical to the hash of the previous segment in the following segment. For example, segment 122 is valid when the value of hash of segment 120 122*a* in segment 122 is identical to hash of segment 120 120*g* in segment 120. Segment 124 is valid when the value of hash of segment 122 124*a* is identical to hash of segment 122 122*g* in segment 122.

Figure 1D:
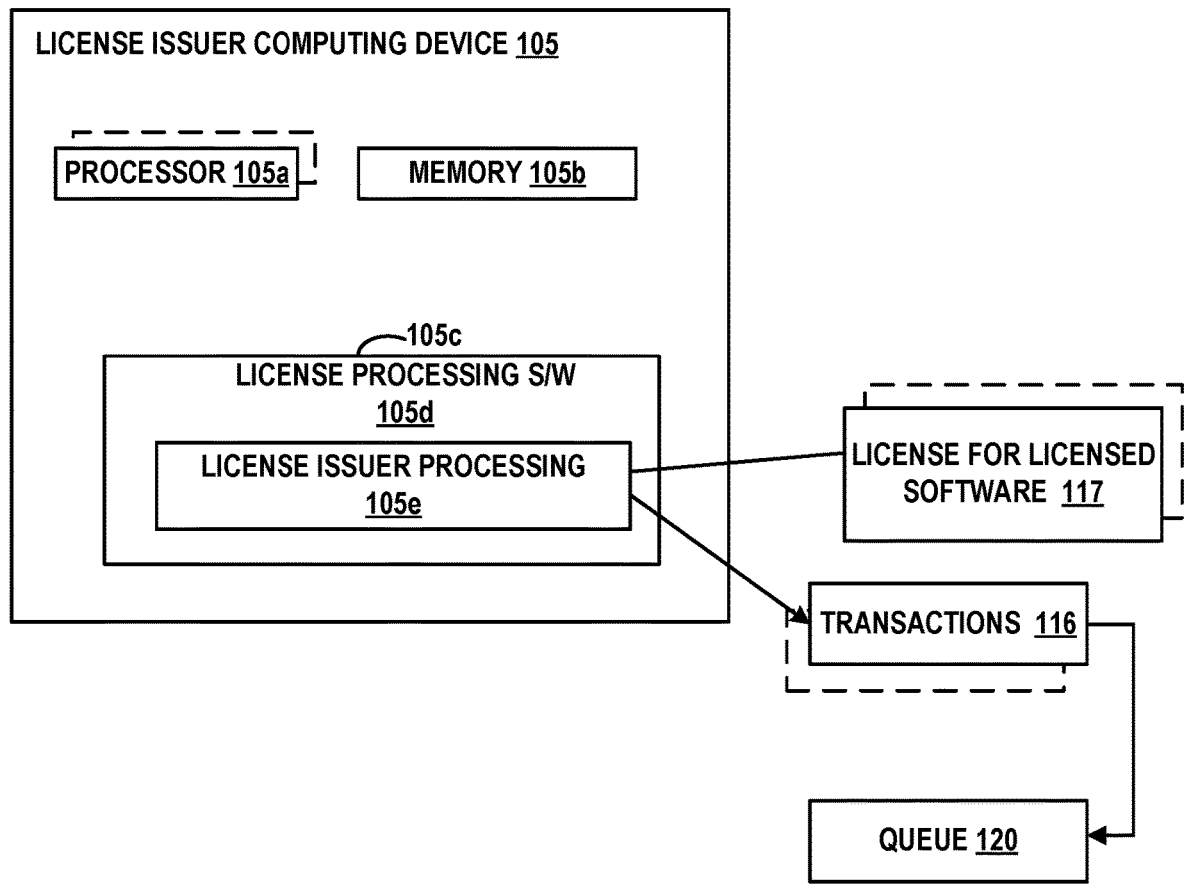
FIG. 1d is a block diagram 100d representing a more detailed example of a portion of block diagram 100a in accordance with aspects of the subject matter disclosed herein.

FIG. 1*d* is a block diagram 100*d* representing a more detailed example of a portion of block diagram 100*a* in accordance with aspects of the subject matter disclosed herein. In FIG. 1*d*, a node representing a license issuer such as but not limited to computing device 105 in the peer-to-peer network 101 is displayed. License issuer 105 can be a computing device as described above with respect to FIG. 1*a* and can include one or more processors such as processor 105*a*, etc. and a memory such as memory 105*b* connected to the processor(s). License issuer 105 can include a copy of licensed software 106 or portions thereof such as copy of licensed software 105*c* which in FIG. 1*d* includes license processing software 105*d* comprising license issuer processing software 105*e*. It will be appreciated that a license issuer node can include any combination of the components of licensed software 106 as illustrated in FIG. 1*b* and may perform validation of transactions, building of segments and releasing of segments to the network, etc. as described above. License processing software 105*d* can include signing and authenticating software (not shown).

A license issuer such as license issuer computing device 105 can issue transactions such as transaction 116, etc. Transaction 116, etc. can be a provisioning transaction. Transaction 116, etc. can be a de-provisioning transaction. A license issuer can issue a license using a provisioning transaction. A license issuer can revoke a license using a de-provisioning transaction. A provisioning transaction can create a license such as license for licensed software 117. In accordance with some aspects of the subject matter described herein, provisioning refers to generation of a public key/private key pair. A provisioning transaction can include a sender identifier (e.g., a public key used to identify the sender, the license issuer), a digital signature that can be used to authenticate the sender public key and a public key that can identify the provisioned license. The associated private key can be handed in a secure fashion to the prospective license holder. A de-provisioning transaction can be used to revoke a license. A de-provisioning transaction can include a public key identifying the sender, (e.g., the license issuer), a digital signature that can be used to authenticate the sender public key and a public key identifying the license that is revoked.

In accordance with aspects of the subject matter disclosed herein, a provisioning transaction is valid if the sender public key value is in the license issuer whitelist and the license public key is not already provisioned, that is, no previous provisioning transaction with the same license public key that is not followed by a de-provisioning transaction of that same license public key exists. A de-provisioning transaction is valid if the sender public key value is in the license issuer whitelist and the license public key is already provisioned, i.e., there exists a previous provisioning transaction with the same license public key that is not followed by a de-provisioning of that same license public key. Valid provisioning and de-provisioning transactions created by the license issuer can be added to a queue such as queue 120 that is accessible to all the nodes in the peer-to-peer network.

Figure 1E:
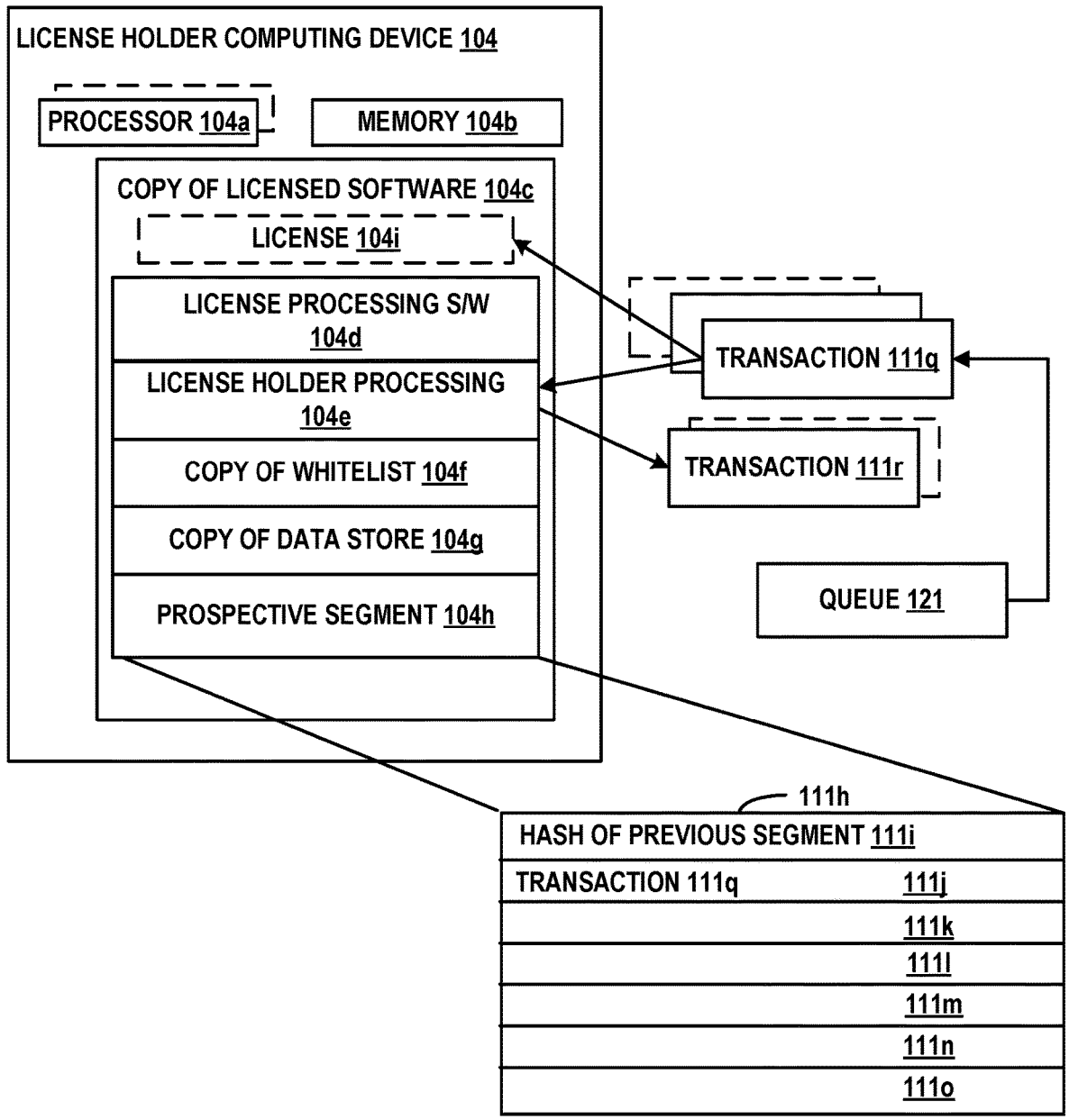
FIG. 1e is a block diagram 100e representing a more detailed example of a portion of block diagram 100a in accordance with aspects of the subject matter disclosed herein.

FIG. 1*e* is a block diagram 100*e* representing a more detailed example of a portion of block diagram 100*a* in accordance with aspects of the subject matter disclosed herein. In FIG. 1e, a node representing a license holder such as, for example, computing device 104 in the peer-to-peer network 101 is displayed. A user who obtains a license for licensed software 106 of FIG. 1b becomes a member of (a node within) the peer-to-peer network. A user who obtains a license to use licensed software 106 is a license holder. A license holder can be a computing device as described above with respect to FIG. 1a and can include one or more processors such as processor 104a, etc., and a memory such as memory 104b connected to the processor(s). License holder computing device 104 can include a copy of licensing software 106 or portions thereof, such as for example, copy of licensed software 104c. License holder computing device 104 can include digital signing and authentication software. Copy of licensing software 104c may include provision for storing a license 104i. License 104i can be pre-provisioned in an inactive state. License 104i can be provisioned by a provisioning transaction and/or revoked by a de-provisioning transaction received from a license issuer. For example, in response to receiving a provisioning transaction published to the network by an approved license issuer, the license 104i can be stored. In response to receiving a de-provisioning transaction published to the network by an approved license issuer, the license 104i can be removed. In the absence of the presence of a provisioned and activated license 104i (public/private key pair), the copy of the licensed software 104c will not work. Copy of licensed software 104c can include or be accompanied by license processing software 104d comprising license holder processing software 104e, a copy of whitelist 104f, and a copy of data store 104g. A license holder can build a segment for prospective addition to the data store such as prospective segment 104h as described more fully below.

A license holder is a licensed user who can run the licensed software locally. The license holder can issue an activation and/or a deactivation transaction, represented in FIG. 1e by transaction 111r. An activation transaction can activate the licensed software. An activation transaction can be used to "turn on" the software. An activation transaction can include a public key identifying the user's license being activated and a digital signature that authenticates the license public key. A deactivation transaction can "turn off" the software. A deactivation transaction can include a public key identifying the license being deactivated and a digital signature that can be used to authenticate the license public key. Transactions can include a sequence number in accordance with some aspects of the subject matter disclosed herein.

An activation transaction is valid if the license public key is a currently provisioned license, i.e., the most recent provisioning/de-provisioning transaction for the license is a provisioning transaction, the license public key is not currently activated, i.e., there exists no activation transactions, or the most recent activation/deactivation transaction for the license is a deactivation transaction. A deactivation transaction is valid if the license public key is a currently provisioned license, i.e., the most recent provisioning/de-provisioning transaction for the license is a provisioning transaction and the license public key is currently activated, i.e., the most recent activation/deactivation transaction for the license is an activation transaction. A deactivation transaction can deactivate the licensed software. If the transaction issued by license holder is valid, the transaction can be published to the peer-to-peer network by adding the transaction to a queue such as queue 121. Transactions that are published in the peer-to peer network can be received by any node in the network.

A license holder such as license holder can receive one or more transactions such as transaction 111q, etc. The one or more transactions may be received from a queue such as queue 121. The license holder can validate a received transaction. If the transaction is valid, the transaction can be added to a prospective segment that the license holder is building. A prospective segment being built by the license holder illustrated in FIG. 1e is illustrated by prospective segment 104h (also shown in expanded view 111h). A prospective segment can include a hash of the previous segment in the data store, and transaction data for a specified number of transactions. After all the transaction data for the segment has been added, a hash of the built segment can be calculated. In FIG. 1e, field 1 hash of previous segment 111i stores the hash of the last segment in the copy of the data store 104g. Suppose license holder has received transaction data for a transaction, (e.g., transaction 111q), has successfully validated the transaction and has stored the data in field 111j. The remainder of the segment (fields 111k, 111l, 111m, and 111n) can be blank until additional valid transaction data is received. After the specified number of transactions have been received, successfully validated and added to the segment 111h, a hash of the segment can be calculated and stored in the field 111o.

When the prospective segment 111h is complete, prospective segment 111h can be offered to the peer-to-peer network 101 as a prospective addition to the distributed data store. Selection of the segment that will be added to the distributed data store can be based on an algorithm or set of rules specified in the license processing logic integrated in or accompanying the licensed software.

FIG. 2a illustrates an example of a method 200 that uses a distributed data store to perform licensing activities at a node such as but not limited to a license holder node in accordance with aspect of the subject matter disclosed herein. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed. In some instances, not all operations performed are illustrated. Method 200 or portions thereof may be executed by a system or a portion of a system such as system 100a-e as described above.

In method 200 at operation 202 a node in the peer-to-peer network representing a license holder can receive or issue a transaction. A received transaction can be an activation, deactivation, provisioning or de-provisioning transaction. An issued transaction can be an activation or deactivation transaction. At operation 204 the node can validate the transaction as described more fully below. At operation 206, in response to determining that the transaction is invalid, processing can return to operation 202. At operation 206, in response to determining that the transaction is valid, the transaction can be added to the segment the node is building at operation 208. At operation 206, in response to determining that the transaction is a provisioning transaction for the node, the license can be stored in the copy of the licensed software at the node as depicted in FIG. 1e. At operation 206, in response to determining that the transaction is a de-provisioning transaction for the node, the license can be removed from the copy of the licensed software at the node as depicted in FIG. 1e. At operation 210, in response to determining that the specified number of transactions for the transaction data portion of the segment has not been added to the segment that the node is building, processing can return to operation 202. At operation 210, in response to determining that the specified number of transactions for the transaction data portion of the segment has been added to the segment that the node is building, the hash of the segment can be calculated and stored in the segment at operation 211. The segment can be released to be processed by a selection algorithm at operation 212 that determines if the released segment will be selected for publication at operation 214. In response to determining that the released segment will be published, the segment can be published at operation 216. In response to publication of the segment at operation 216, the segment can be added to the distributed data store at operation 218. A license holder can issue a deactivation or activation transaction as described above.

FIG. 2b illustrates an example of a method 201 that uses a distributed data store to perform licensing activities at a license issuer node in accordance with aspect of the subject matter disclosed herein. While method 201 describes a series of operations that are performed in a sequence, it is to be understood that method 201 is not limited by the order of the sequence depicted. For instance, some operations may occur in a different order than that described. In addition, one operation may occur concurrently with another operation. In some instances, not all operations described are performed. In some instances, not all operations performed are illustrated.

Method 201 or portions thereof may be executed by a system or a portion of a system such as system 100a-e as described above. At operation 222 the license issuer can issue a transaction. The transaction can be a provisioning transaction or a de-provisioning transaction. The transaction can include a public key identifying the license issuer, a digital signature for authentication of the license issuer public key and a license public key that identifies the license for the licensed software. A provisioning transaction is valid if the license issuer public key is in the license issuer whitelist and the license public key is not provisioned. A de-provisioning transaction is valid if the license issuer public key is in the license issuer whitelist and the license public key is provisioned. The license issuer may in addition perform all or some of the operations performed by a license holder (not shown), as illustrated and described with respect to FIG. 2a and FIGS. 1a-1e.

Described herein is a software license issuer, the software license issuer issuing a license for licensed software to a node in a peer-to-peer software licensing network, the software license issuer comprising a memory connected to a processor; the processor configured to issue a transaction to the peer-to-peer software licensing network, the transaction comprising a public key used to identify the license issuer, a digital signature for authentication of the license issuer public key and a license public key that identifies a license for the licensed software. The transaction can comprise a provisioning transaction, the provisioning transaction creating a license for the licensed software. The provisioning transaction is valid if the license issuer public key is in the license issuer whitelist and the license public key is not provisioned. The transaction can comprise a de-provisioning transaction, the de-provisioning transaction revoking a license for the licensed software. The de-provisioning transaction is valid if the license issuer public key is in the license issuer whitelist and the license public key is provisioned. The software license issue can comprise a node in the peer-to-peer software licensing network.

Described herein is a software license holder comprising a node in a peer-to-peer software licensing network, the software license holder comprising a memory connected to a processor; the processor configured to receive from a node in the peer-to-peer software licensing network a transaction, validate the transaction; and in response to successful validation of the transaction, add the transaction to a segment comprising a hash of a final segment in a data store of linked segments, software licensing transaction data and a hash of the segment, the segment comprising a potential addition to a copy of a distributed data store at the node, the distributed data store comprising linked segments where each segment comprises a hash of a previous segment in the data store. The segment can be released for publication to the peer-to-peer software licensing network. In response to receiving a published segment from the peer-to-peer network, the published segment can be added to the copy of the distributed data store at the node. The node can discard the segment comprising the potential addition to the copy of the distributed data store at the node. The software license holder can issue a transaction. The transaction can comprise a license public key identifying the license holder's license and a digital signature that authenticates the license public key. The transaction can comprise an activation transaction that activates licensed software and wherein the activation transaction is valid if a license public key identifying the license holder's license is a currently provisioned license and the license public key is not activated. The transaction can comprise a deactivation transaction that deactivates the licensed software, wherein the deactivation transaction is valid if a license public key identifying the license holder's license is a currently provisioned license and the license public key is activated. The received transaction can be a provisioning transaction received from a license issuer, the provisioning transaction comprising a public key identifying the license issuer, a digital signature for authentication of the license issuer public key and a license public key that identifies the license; and wherein the provisioning transaction is valid if the license issuer public key is in the license issuer whitelist and the license public key is not provisioned. The received transaction is a de-provisioning transaction received from a license issuer, the de-provisioning transaction comprising a public key identifying the license issuer, a digital signature for authentication of the license issuer public key and a license public key that identifies the license; and wherein the de-provisioning transaction is valid if the license issuer public key is in the license issuer whitelist and the license public key is provisioned.

Described herein is a method of using a peer-to-peer network to perform software license processing without a license server comprising receiving by a processor of a first node in the peer-to-peer software license processing network, the first node comprising a license holder for licensed software, the license holder comprising license holder processing logic, a copy of a whitelist of approved software issuers and a copy of a distributed data store comprising linked segments in which a subsequent segment of the distributed data store comprises a hash of a preceding segment, receiving a transaction from a second node in the peer-to-peer software license processing network, in response to successful validation of the transaction, adding the transaction to a segment at the first node, the segment comprising a potential addition to the distributed data store, where the segment at the first node comprises a hash of a final segment in the copy of the distributed data store at the first node, licensing transaction data and a hash of the segment at the first node. An activation transaction can be issued, the activation transaction comprising a license public key identifying the license holder's license and a digital signature that authenticates the license public key; and wherein the activation transaction is valid if a license public key identifying the license holder's license is a currently provisioned license and the license public key is not activated. A deactivation transaction can be issued, the deactivation transaction comprising a license public key identifying the license holder's license and a digital signature that authenticates the license public key and wherein the deactivation transaction is valid if a license public key identifying the license holder's license is a currently provisioned license and the license public key is activated. The second node can comprise a license issuer and the transaction can be a provisioning transaction received from the license issuer, the provisioning transaction comprising a public key identifying the license issuer, a digital signature for authentication of the license issuer public key and a license public key that identifies the license; and wherein the provisioning transaction is valid if the license issuer public key is in the license issuer whitelist and the license public key is not provisioned. The second node can comprise a license issuer and the transaction can be a de-provisioning transaction received from a license issuer, the de-provisioning transaction comprising a public key identifying the license issuer, a digital signature for authentication of the license issuer public key and a license public key that identifies the license; and wherein the de-provisioning transaction is valid if the license issuer public key is in the license issuer whitelist and the license public key is provisioned.

Example of a Suitable Computing Environment

Figure 3:
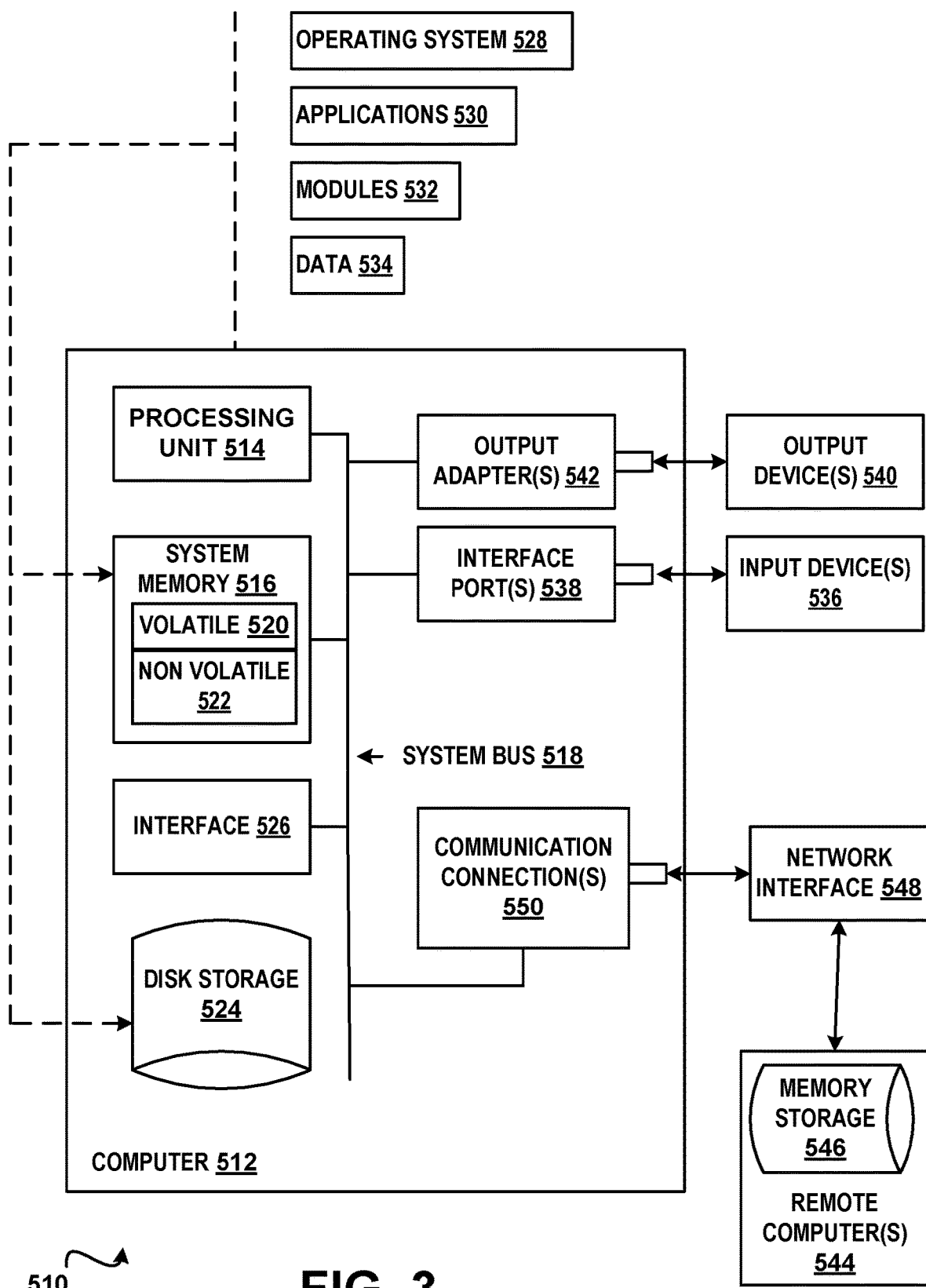
FIG. 3 is a segment diagram of an example of a computing environment in accordance with aspects of the subject matter described herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above.

Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A software license issuer, the software license issuer issuing a license for licensed software to a node in a peer-to-peer software licensing network, the software license issuer comprising:
    a memory connected to a processor; the processor configured to:
        issue a transaction to the peer-to-peer software licensing network, the transaction comprising a license issuer public key used to identify the software license issuer, a digital signature for authentication of the license issuer public key, and a license public key that identifies the license for the licensed software,
        wherein, in at least one instance, the transaction comprises a provisioning transaction creating the license for the licensed software,
        wherein the provisioning transaction is valid when the license issuer public key is in a license issuer whitelist and the license public key is not provisioned.

2. The software license issuer of claim 1, wherein, in at least one other instance, the transaction comprises a de-provisioning transaction, the de-provisioning transaction revoking the license for the licensed software.

3. The software license issuer of claim 2, wherein the de-provisioning transaction is valid when the license issuer public key is in the license issuer whitelist and the license public key is provisioned.

4. The software license issuer of claim 1, wherein the software licenser issuer comprises another node in the peer-to-peer software licensing network.

5. A software license holder comprising a node in a peer-to-peer software licensing network, the software license holder comprising:
    a memory connected to a processor; the processor configured to:
        receive, from another node in the peer-to-peer software licensing network, a transaction relating to a software license for licensed software;
        validate the transaction; and
        in response to successful validation of the transaction, add the transaction to a particular segment comprising a hash of a final segment in a distributed data store, software licensing transaction data, and a hash of the particular segment,
        the particular segment comprising a potential addition to a copy of the distributed data store at the node, the distributed data store comprising linked segments where each segment comprises a hash of a previous segment in the distributed data store,
        wherein, in at least one instance, the transaction comprises an activation transaction that activates the licensed software and wherein the activation transaction is valid when a license public key identifies the software license as currently provisioned and the license public key is not currently activated.

6. The software license holder of claim 5, wherein the processor is further configured to:

release the particular segment for publication to the peer-to-peer software licensing network.

7. The software license holder of claim 5, wherein the processor is further configured to:
in response to receiving a published segment from the peer-to-peer software licensing network, add the published segment to the copy of the distributed data store at the node.

8. The software license holder of claim 7, wherein the processor is further configured to:
responsive to receipt of the published segment, discard the particular segment comprising the potential addition to the copy of the distributed data store at the node.

9. The software license holder of claim 5, the activation transaction comprising the license public key and a digital signature that authenticates the license public key.

10. The software license holder of claim 9, wherein, in at least one other instance, the transaction comprises a deactivation transaction that deactivates the licensed software, wherein the deactivation transaction is valid when the license public key identifies the software license as currently provisioned and the license public key is currently activated.

11. The software license holder of claim 5, wherein, in at least one other instance, the transaction comprises a provisioning transaction received from a software license issuer, the provisioning transaction comprising a license issuer public key identifying the software license issuer, a digital signature for authentication of the license issuer public key, and the license public key identifying the software license, and wherein the provisioning transaction is valid when the license issuer public key is in a license issuer whitelist and the license public key is not currently provisioned.

12. The software license holder of claim 5, wherein, in at least one other instance, the transaction is a de-provisioning transaction received from a software license issuer, the de-provisioning transaction comprising a license issuer public key identifying the software license issuer, a digital signature for authentication of the license issuer public key, and the license public key identifying the software license, and wherein the de-provisioning transaction is valid when the license issuer public key is in a license issuer whitelist and the license public key is currently provisioned.

13. The software license holder of claim 5, wherein the processor is further configured to:
add the particular segment to the distributed data store based at least on a consensus proof of work algorithm performed with other nodes of the peer-to-peer software licensing network.

14. The software license holder of claim 5, wherein the processor is further configured to:
receive a published segment from one or more other nodes of the peer-to-peer software licensing network; and
responsive to receipt of the published segment, discard the particular segment and begin building a new segment.

15. The software license holder of claim 5, wherein the processor is further configured to:
execute the licensed software, the licensed software implementing the activation transaction.

16. The software license holder of claim 5, wherein the processor is further configured to:
offer the particular segment to the peer-to-peer software licensing network as the potential addition to the distributed data store.

17. A method of using a peer-to-peer network to perform software license processing, the method comprising:
receiving, by a processor of a first node in the peer-to-peer network, a copy of a license issuer whitelist of approved software issuers and a copy of a distributed data store comprising linked segments in which a subsequent segment of the distributed data store comprises a hash of a preceding segment;
receiving a particular transaction from a second node in the peer-to-peer network;
in response to successful validation of the particular transaction, adding the particular transaction to a particular segment at the first node, the particular segment comprising a potential addition to the distributed data store, where the particular segment comprises a hash of a final segment in the copy of the distributed data store, licensing transaction data, and a hash of the particular segment; and
generating a deactivation transaction comprising a license public key identifying a software license and a digital signature that authenticates the license public key,
wherein the deactivation transaction is valid when the license public key identifying the software license is currently provisioned and the license public key is already activated.

18. The method of claim 17, further comprising:
generating an activation transaction comprising the license public key identifying the software license and a another digital signature that authenticates the license public key,
wherein the activation transaction is valid when the license public key identifying the software license is currently provisioned and the license public key is not already activated.

19. The method of claim 17, wherein the second node comprises a license issuer and the particular transaction is a provisioning transaction received from the license issuer, the provisioning transaction comprising a license issuer public key identifying the license issuer, another digital signature for authentication of the license issuer public key, and the license public key identifying the software license, and wherein the provisioning transaction is valid when the license issuer public key is in the license issuer whitelist and the license public key is not already provisioned.

20. The method of claim 17, wherein the second node comprises a license issuer and the particular transaction is a de-provisioning transaction received from the license issuer, the de-provisioning transaction comprising a license issuer public key identifying the license issuer, another digital signature for authentication of the license issuer public key, and the license public key identifying the software license, and wherein the de-provisioning transaction is valid when the license issuer public key is in the license issuer whitelist and the license public key is already provisioned.

* * * * *